United States Patent
Grajcar

(10) Patent No.: US 8,183,794 B2
(45) Date of Patent: *May 22, 2012

(54) APPARATUS AND METHODS FOR THE THERMAL REGULATION OF LIGHT EMITTING DIODES IN SIGNAGE

(75) Inventor: Zdenko Grajcar, Crystal, MN (US)

(73) Assignee: Nexxus Lighting, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,065

(22) Filed: May 3, 2011

(65) Prior Publication Data

US 2011/0203149 A1     Aug. 25, 2011

Related U.S. Application Data

(63) Continuation of application No. 12/082,427, filed on Apr. 10, 2008, now Pat. No. 7,948,190.

(60) Provisional application No. 60/922,803, filed on Apr. 10, 2007.

(51) Int. Cl.
     *H05B 37/00*     (2006.01)

(52) U.S. Cl. .................... 315/291; 315/185 R; 315/191; 315/192

(58) Field of Classification Search ............. 315/185 R, 315/191, 192, 291
     See application file for complete search history.

(56) References Cited

U.S. PATENT DOCUMENTS

| 6,111,739 | A  |    8/2000 | Wu et al. |
| 6,313,589 | B1 |   11/2001 | Kobayashi et al. |
| 6,400,101 | B1* |   6/2002 | Biebl et al. ..................... 315/291 |
| 6,478,450 | B1* |  11/2002 | Grajcar ........................ 362/239 |
| 6,693,394 | B1 |    2/2004 | Guo et al. |
| 7,196,481 | B2 |    3/2007 | Bushell et al. |
| 7,948,190 | B2* |   5/2011 | Grajcar ........................ 315/291 |

* cited by examiner

*Primary Examiner* — David Hung Vu
(74) *Attorney, Agent, or Firm* — Baker & Hostetler, LLP

(57) ABSTRACT

Apparatus and methods for the thermal management of one or more light emitting diode (LED) modules disposed within a channel sign are disclosed. The apparatus, in various aspects, detects the ambient temperature generally proximate the LED module and regulates the current flowed onto the LED's within the LED module based upon the ambient temperature. Methods for thermal management of the one or more LED modules disposed within a channel sign are disclosed herein.

9 Claims, 4 Drawing Sheets

APPARATUS AND METHODS FOR THE THERMAL REGULATION OF LIGHT EMITTING DIODES IN SIGNAGE

CROSS-REFERENCE TO RELATED APPLICATIONS

This application is a continuation that claims the benefit and priority of U.S. application Ser. No. 12/082,427 filed Apr. 10, 2008, now U.S. Pat. No. 7,948,190, which issued May 24, 2011, which claims benefit to U.S. provisional patent application No. 60/922,803 filed on Apr. 10, 2007, the disclosure of which are hereby incorporated herein in their entirety by reference thereto.

BACKGROUND

1. Field of the Invention

The present disclosure relates to lighted signs, and, more particularly to thermal regulation of light emitting diodes in channel signs.

2. Description of the Related Art

Light emitting diodes (LED) are used in the sign industry for the illumination of channel signs. The expected lifespan of the LED systems used in the signs is on the order of 50,000 hours. However, the LED's are sensitive to high ambient temperatures. Exposure to elevated temperatures will reduce the luminous output of an LED and reduce lifespan of the LED to unacceptable levels.

The channel sign may include a cover plus a body that forms side walls and a back. The cover may be placed over the body thereby defining a sign cavity, and one or more LED's are disposed within the sign cavity to provide light. The cover is generally translucent and may be clear or may include one or more colors so that the light generated by the one or more LED's passes through the cover. The walls and or back within the cavity may be metallic and/or colored.

The sign cavity of the channel sign is generally substantially thermally insulated so that heat generated by the LED's disposed therein is retained within the cavity. In outdoor applications, the channel sign including the sign cavity may be heated by the ambient conditions including solar heating. For example, a channel sign with black matte aluminum body and a red acrylic cover was mounted on a dark brick wall and exposed to direct sunlight in Minnesota during July, 2005. The aluminum cavity walls of the sign cavity reached temperatures in excess of 135° C. and air temperatures in the sign cavity exceeded 90° C.

Heat-sinks have been used to manage the temperature of the LED's within the sign cavity. The heat-sink dissipates heat from areas with higher temperature to areas with lower temperature by conduction. The heat sink may conduct heat from the LED to the body of the channel sign for dissipation. However, in some circumstances, instead of transferring heat from the LED to the body of the channel sign, the heat sink may transfer heat from the body to the LED thereby heating the LED.

Air circulation has been used to manage the temperature of the LED's within the sign cavity. This may be achieved by using the air vents and/or fans, and may be effective. However the fan may be bulky and noisy and may result in collection of dust and dirt as well as water within the sign cavity.

Timers have been used to manage the temperature of the LED's within the sign cavity. The timer, for example, is set to turn the LED's off during the daytime to avoid operating the LED's when the channel sign is subject to solar heating and hot daytime temperatures. However, this requires adjustment of the timer throughout the year in order to ensure that the LED's are turned on at night and turned off during the daytime.

Photoresistors and similar light detection devices have been used to manage the temperature of the LED's within the sign cavity by detecting sunlight or daylight conditions generally and dark and/or nighttime conditions. The LED's within the channel sign are switched on or off in response to the conditions detected by the photoresistor. The photoresistor must be kept clean as dirt, water, and suchlike can interfere with the transmission of light to the photoresistor and, hence, the operation of the photoresistor. In addition, inclusion of the photoresistor adds to the cost of the channel sign.

Accordingly, a need exists for apparatus and methods for the thermal regulation of LED's within a channel sign.

SUMMARY

Apparatus and methods disclosed herein may resolve many of the needs and shortcomings discussed above and may provide additional improvements and advantages recognizable by those of ordinary skill in the art upon study of this specification.

A channel sign apparatus is disclosed herein. In various aspects, the channel sign has a channel sign housing with a sign cavity therein. A power distribution circuit is disposed within the channel sign, and a plurality of LED modules disposed within the channel sign cavity, and each of the LED modules is electrically coupled to the power distribution circuit. Each of the LED modules includes at least one LED intended for operation within a normal temperature range, a driver circuit coupled to the LED for supplying current thereto, a control circuit coupled to the driver for regulating the current from the driver to the LED; and a temperature sensor coupled to the control circuit and mounted on the LED module for furnishing a temperature signal to the control circuit indicative of ambient temperature about the LED. The control circuit is responsive to the temperature signal for reducing or cutting off current from the driver circuit to the LED when the ambient temperature exceeds the normal temperature range.

Methods for thermally managing a channel sign having a plurality of LED modules disposed within a cavity therein, each having at least one LED are disclosed herein. In various aspects, the methods include detecting a first ambient temperature proximate a first LED in a first one of the LED modules, supplying maximum forward current to the first LED when the first ambient temperature is within a first normal temperature range for the first LED, cutting off current to the first LED when the first ambient temperature exceeds a first cutoff temperature in excess of the first normal temperature range for the first LED, detecting a second ambient temperature proximate a second LED in a second one of the LED modules; supplying maximum forward current to the second LED when the second ambient temperature is within a second normal temperature range for the second LED, and cutting off current to the second LED when the second ambient temperature exceeds a second cutoff temperature in excess of the second normal temperature range for the second LED. The steps of detecting, supplying and cutting for the first LED are independent of the steps of detecting, supplying and cutting for the second LED.

Other features and advantages of the methods, apparatus, and compositions disclosed herein will become apparent from the following detailed description and from the claims.

Figure 1:
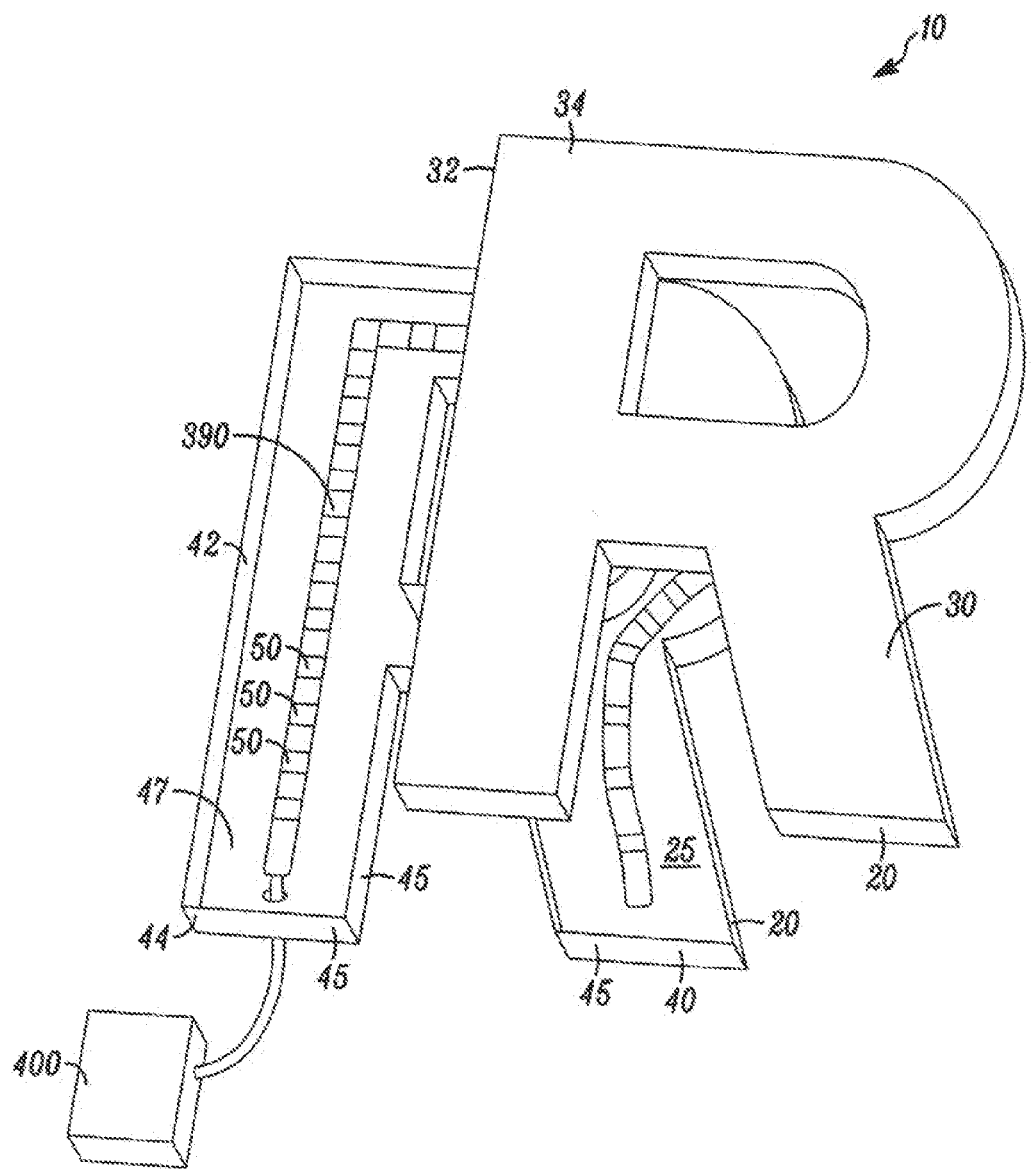
FIG. 1 is a perspective view of an exemplary implementation of a thermal management apparatus including a plurality of LED modules disposed within a sign cavity of a channel sign.

All Figures are illustrated for ease of explanation of the basic teachings of the present invention only. The extensions of the Figures with respect to number, position, order, relationship and dimensions will be explained or will be within the ordinary skill of the art after the description has been studied. Furthermore, the apparatus, materials and other operational parameters to conform to specific size, force, weight, strength, velocity, temperatures, flow, and similar requirements will likewise be within the ordinary skill of the art after the description has been studied. Where used in reference to the figures, the terms "top," "bottom," "right," "left," "forward," "rear," "first," "second," "inside," "outside," and similar terms should be understood to reference the structure and methods described in the specification and illustrated in the drawings and are utilized for purposes of explanation.

DETAILED DESCRIPTION

The thermal management apparatus described herein includes, in various aspects, an LED module having a temperature sensor, a thermal controller, a driver, and one or more LED's. The driver delivers regulated current from a power source to the one or more LED's. The temperature sensor detects the ambient temperature proximate the LED module. The thermal controller modulates the current delivered by the driver from the power source to the LED's within the LED module in response to the ambient temperature detected by the temperature sensor in order to prevent thermal damage to the LED's including runaway. At some ambient temperature conditions, the thermal controller may direct the driver to deliver a maximum forward current to the LED's within the LED module. At other ambient temperature conditions, the thermal controller may direct the driver to deliver a derated current to the LED's within the LED module. In various aspects, the derated current decreases in a generally continuous manner from the maximum forward current as the ambient temperature increases. The thermal controller, at certain ambient temperature conditions, may direct the driver to cut off the current to the LED's within the LED module. One or more LED modules with the thermal controller and the temperature sensor disposed thereabout are located within a sign cavity defined by a channel sign in various aspects.

The Figures generally illustrate various exemplary implementations of the thermal management apparatus and methods. The particular exemplary implementations illustrated in the Figures provide for ease of explanation and understanding, even while being fully descriptive. These illustrated implementations are not meant to limit the scope of coverage, but, instead, to assist in understanding the context of the language used in this specification and in the claims. Accordingly, variations of the active thermal management apparatus and methods that differ from the illustrated implementations may be encompassed by the appended claims.

FIG. 1 illustrates an implementation of active thermally managed signage 10 that includes a channel sign 20 with many LED modules 50 arranged therein. As illustrated in FIG. 1, the channel sign 20 includes a cover 30 and body 40. In various implementations, the channel sign 20 includes channel letters, light boxes, and the like, and may be configured in various ways. With continuing reference to FIG. 1, the cover 30 has a cover inner surface 32 and a cover outer surface 34. The body 40 has a body inner surface 42 and a body outer surface 44, and is configured to form side walls 45 and a back 47. The cover 30 is secured in relation to the body 40 such that the cover inner surface 32 and the body inner surface 42 define a sign cavity 25. The cover 30 may be made of various translucent materials including plastic and glass which allow light to pass therethrough, and may be clear, tinted, or combinations thereof. The body 40 may be made of metal, plastic, or combinations thereof, and may be formed as a unitary piece of material or may be formed of several pieces, which may be held together by rivets, screws or other fasteners, and/or by welds, adhesive, epoxy, and so forth, or may otherwise be formed. In various implementations, at least portions of the body 40 may be made of translucent material. In various implementations, at least portions of the body inner surface 42 and/or the body outer surface 44 may be bare metal or other bare/uncoated material, may be painted, or may be surfaced in other ways and combinations of ways.

As illustrated in FIG. 1, the LED modules 50 are affixed to a conductive strip 390 within the sign cavity 25, to illuminate the channel sign 20. The conductive strip 390 is secured to the body inner surface 42 within the cavity 25 to secure the LED modules 60 within the cavity 25, and the conductive strip 390 distributes electrical power from a power source 400 to the LED modules 50. The conductive strip 390, as illustrated, is generally flexible with a ribbon-like configuration and includes multiple insulated electrical pathways. In other implementations, power may be communicated from the power source 400 to the LED modules 50 within the sign cavity 25 by wires, cables, and the like. In some implementations, all of the LED modules 50 are essentially identical, while, in other implementations, the plurality of LED modules 50 includes one or more dissimilar LED modules 50.

Figure 2:
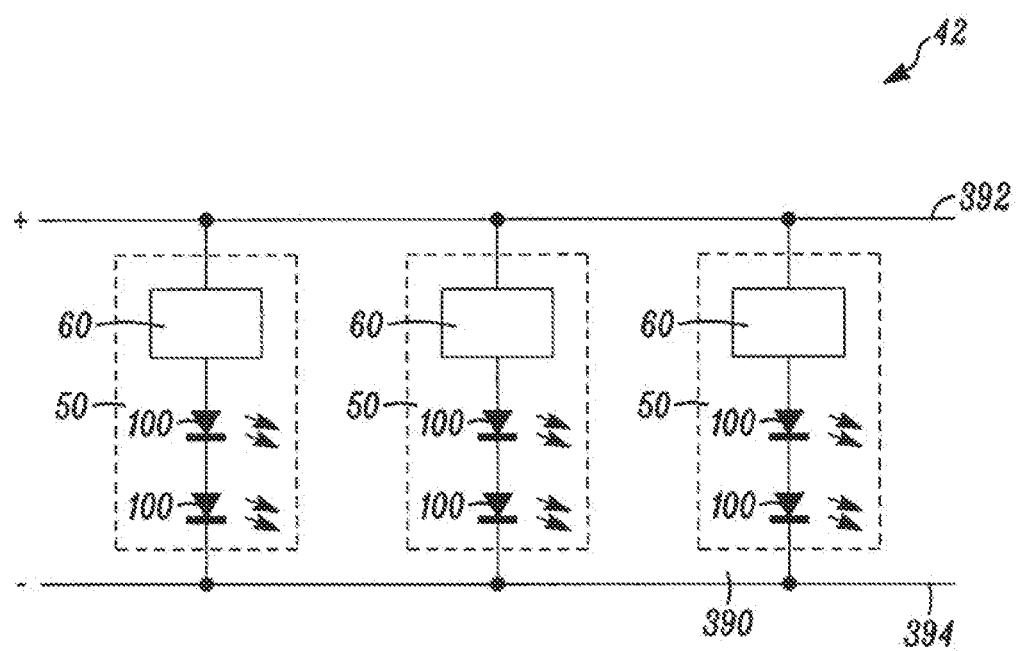
FIG. 2 is a circuit schematic diagram of an exemplary implementation of a plurality of LED modules.

FIG. 2 illustrates a portion of the electrical circuit for the channel sign 20, which includes the conductive strip 390 and the LED modules 50. The LED modules 50 are electrically connected to a first conductor 392 and a second conductor 394 disposed within the conductive strip 390 to communicate electrical power to the LED modules 50. Each of the LED modules 50, as illustrated, include a controller 60 in electrical communication with two LED's 100 in series. In various implementations, the LED module 50 may include one or more LED's 100. In implementations having a plurality of LED's 100, the LED's 100 may be disposed in series, in parallel, or combinations thereof.

Figure 3:
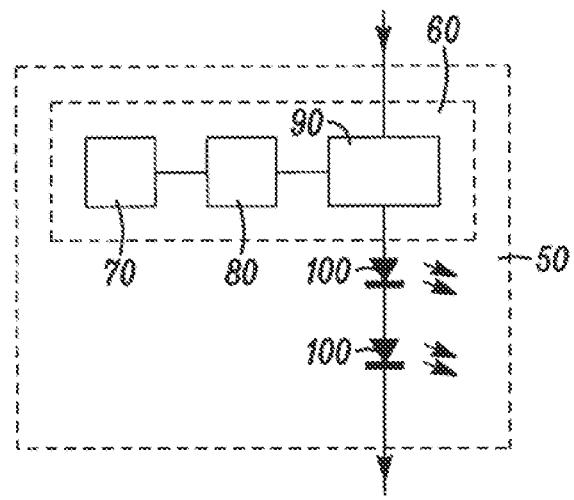
FIG. 3 is a block schematic diagram of an exemplary implementation of an LED module.

FIG. 3 illustrates an implementation of the LED module 50 including an implementation of the controller 60. The controller 60, as illustrated, includes a driver 90, a temperature sensor 70, and a thermal controller 80. The driver 90 delivers current to the LED's 100 at generally less than or equal to the maximum forward current as recommended by the manufacturer of the LED 100. The temperature sensor 70 detects the ambient temperature, which is the temperature generally proximate the LED module 50 within the sign cavity 25, generates a temperature signal indicative of the ambient temperature, and communicate the temperature signal to the thermal controller 80. The thermal controller 80 is in electrical communication with the temperature sensor 70 and with the driver 90, as illustrated. The thermal controller 80, in this implementation, receives the temperature signal from the temperature sensor 70 and controls the current delivered by the driver 90 to the LED's 100 within the LED module 50 in response to the temperature signal.

In operation, the LED module 50 is exposed to an ambient temperature which (a) may lie within a normal temperature range bounded at the upper end by a regulating temperature, or (b) may lie within a current compensation region bounded at the lower end by the regulating temperature and at the upper end by a cut-off temperature, or (c) may exceed the cut-off temperature. If the ambient temperature falls within the normal temperature range, the maximum forward current is supplied to the LED's 100 contained in the LED module 50 without substantially degrading the LED's 100. In the implementation illustrated in FIG. 3, for example, if the temperature signal from the temperature sensor 70 indicates that the ambient temperature lies within the normal temperature range, the thermal controller 80 directs the driver 90 to supply the maximum forward current to the one or more LED's 100 contained in the LED module 50. If the temperature signal from the temperature sensor 70 indicates that the ambient temperature lies within the current compensation region, the thermal controller 80 directs the driver to derate the current from the maximum forward current so that the derated current is supplied to the LED's 100 contained in the LED module 50 in order to prevent thermal damage to the LED's 100 and/or runaway. The derated current is less than the maximum forward current, and decreases as the ambient temperature increases above the regulating temperature. In various implementations, the derated current may decrease in a generally continuous manner. If the temperature signal from the temperature sensor 70 indicates that the ambient temperature exceeds the cut-off temperature, the thermal controller 80 then directs the driver 90 to cut off the output current, so that no current is supplied to the LED's 100 contained in the LED module 50 in order to prevent thermal damage to the LED's 100 and/or runaway. In various implementations, the current supplied to the LED's 100 within the LED module may be continuously decreased substantially to zero current as the ambient temperature exceeds the cut-off temperature.

In the illustrative implementation of FIG. 1, a number of LED modules 50 are disposed within the sign cavity 25 of the channel sign 20, and operate independently of one another. For example, a portion of the LED modules 50 within the sign cavity 25 may be in locations where the ambient temperature is below the cut-off temperature, so that the LED's 100 on these LED module 50 receive current and remain lighted, while the ambient temperature proximate other LED modules 50 within the sign cavity 25 may exceed the cut-off temperature so that the current would be cut off to the LED's 100 on these LED modules 50.

As a further example, a portion of the channel sign 20 with a plurality of LED modules arranged within the sign cavity 25 thereof may be exposed to the sun so that the ambient temperature in the sun exposed portion exceeds the cut-off temperature. Another portion of the channel sign 20 may be shaded, so that the ambient temperature in the shaded portion remains below the cut-off temperature. The LED's 100 on the LED modules 50 within the sun exposed portion are shut off, while the LED's 100 on the LED modules 50 within the shaded portion remain lighted. In this example, some of the LED modules 50 within the shaded portion supply the maximum forward current to the LED's 100 included therein, while other LED modules 50 within the shaded portion supply derated current to the LED's 100 included therein. The derated current depends upon the ambient temperature and varies between the LED modules 50 depending upon the ambient temperature proximate each LED module 50. Each LED module 50 supplies current to the LED's 100 contained thereon dependent upon the ambient temperature proximate the LED module 50 and independent of other LED modules 50 that may be present.

Figure 4:
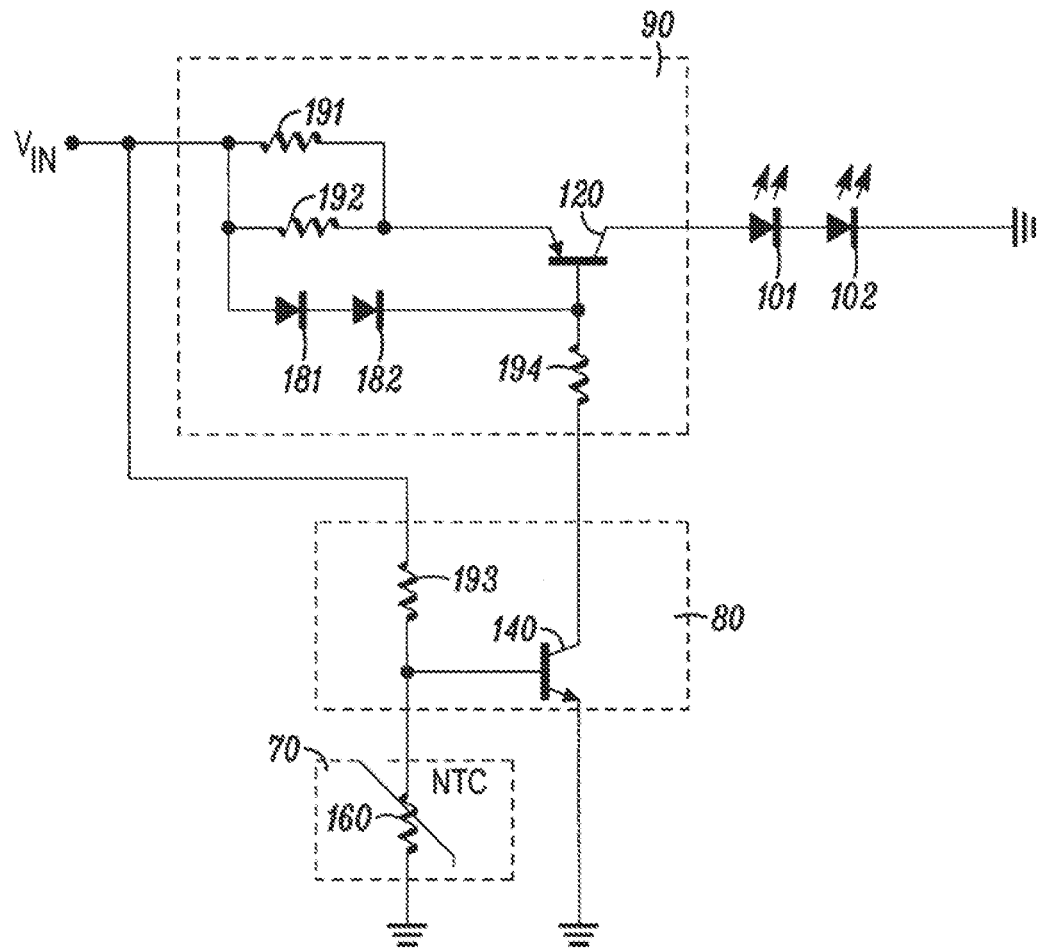
FIG. 4 is a circuit schematic diagram of portions of the circuitry of an exemplary implementation of an LED module.

An illustrative implementation of the driver 90, the temperature sensor 70, and the thermal controller 80 are shown in FIG. 4. The driver 92, as illustrated, includes driver transistor 120 to supply regulated current to series-connected LED 101 and LED 102. Parallel-connected resistor 191 and resistor 192 are connected between the emitter of driver transistor 120 and the voltage source $V_{in}$ to drop the voltage at the emitter of driver transistor 120. Series-connected diodes 181 and diode 182 are connected between the base of driver transistor 120 and the voltage source $V_{in}$ to drop the voltage at the base of the driver transistor 120 by two forward voltage drops when forward-biased.

The temperature sensor 70, as illustrated in FIG. 4, is a thermistor 160, and more specifically, a negative temperature coefficient ("NTC") thermistor. The resistance of thermistor 160 decreases as the temperature of the thermistor 160 increases and vica-versa. In other implementations, a positive temperature coefficient ("PTC") thermistor may be used as the temperature sensor 70, and in still other implementations, the temperature sensor 70 may be based upon various temperature sensitive integrated circuits.

The thermal controller 80 is suitably designed to correspond to the type of temperature sensor 70, such designs being known to one of ordinary skill in the art upon study of this specification. An illustrative thermal controller 80 that is suitable for use with an NTC thermistor includes control transistor 140, the collector of which is connected to the base of driver transistor 120 through resistor 194, and the emitter of which is connected to ground. Voltage is applied to the base of control transistor 140 from the voltage source $V_{in}$ through resistor 193. The base of the control transistor 140 is connected to ground through the thermistor 160, so that the magnitude of the voltage applied to the base of the control transistor 140 is determined by the ratio of the resistance of resistor 193 to the NTC resistance of the thermistor 160.

Driver transistor 120 and control transistor 140 are, illustratively, bipolar junction transistors ("BJT") with p-n-p and n-p-n polarities, respectively, in the implementation of FIG. 4. However, driver transistor 120 and control transistor 140 may be implemented by other transistor types in suitably modified circuits, which would be known to one of ordinary skill in the art upon study of this specification.

The implementation of FIG. 4 operates in the following manner. When the ambient temperature is in the normal temperature range, the thermistor 160 provides a magnitude of resistance so that the voltage applied to the base of control transistor 140 drives the control transistor 140 to pull down the base of driver transistor 120, so that maximum forward current is supplied by the driver transistor 120 to the LED 101 and LED 102. As the ambient temperature exceeds the regulating temperate and rises into the current compensation region, the resistance of thermistor 160 is reduced. This, in turn, reduces the voltage at the base of the control transistor 140, which increases the voltage at the base of the driver transistor 120. The current supplied by the driver transistor 120 to the LED 101 and LED 102, the derated current, is reduced correspondingly below the maximum forward current in a generally continuous manner. As the ambient temperature exceeds the cut-off temperature, the resistance of the thermistor 160 is generally negligible, and the base of thermal control transistor 140 is essentially grounded, so that the voltage at the base of thermal control transistor 140 is essentially zero. The base of the driver transistor 120 is, accordingly, decoupled from ground and voltage is applied to the base of the driver transistor 120 sufficient to cut off current flow between the emitter and collector of the driver transistor 120 and, hence, to the LED 101 and LED 102.

Figure 5:
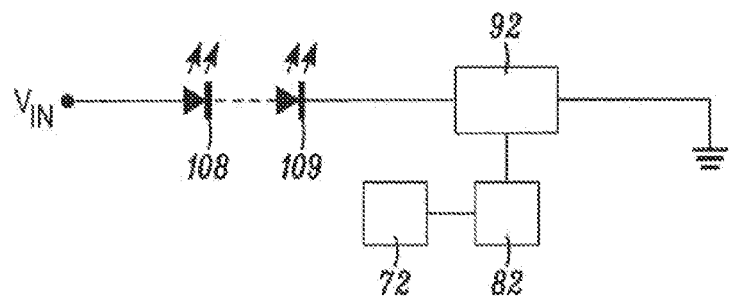
FIG. 5 is a block schematic diagram of another exemplary implementation of an LED module.

FIG. 5 shows alternative implementations in which a driver 92 may act as a current sink in order to deliver regulated current to LED 108 and LED 109. In this implementation, the driver 92 in combination with a thermal controller 82 and a temperature sensor 72 is interposed between the LED 108 and LED 109 and ground. The driver 92, in this implementation, regulates the current delivered to the LED 108 and LED 109 by regulating the connection of LED 108 and LED 109 to ground. The temperature sensor 72 generates a temperature signal indicative of the ambient temperature, and communicates the temperature signal to the thermal controller 82. The thermal controller 82 is electrically connected to the temperature sensor 72 and with the driver 92, as illustrated. The thermal controller 82, in this implementation, receives the temperature signal from the temperature sensor 72 and cooperates with the driver 92 to control the current delivered by the driver 92 to the LED 108 and the LED 109 in response to the temperature signal.

Figure 6:
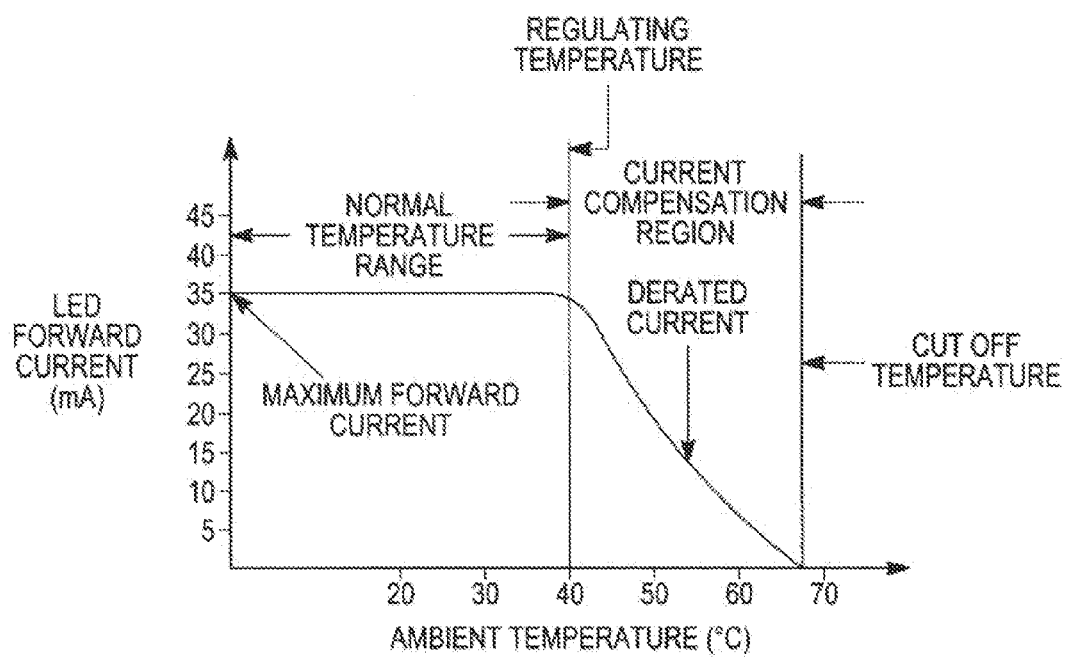
FIG. 6 is a graph showing forward current as a function of ambient temperature for an exemplary implementation of an LED.

FIG. 6 generally illustrates the normal temperature range and the current compensation region as well as the regulating temperature and the cut-off temperature for an implementation of the thermal management apparatus 10. The normal temperature range, the current compensation region, the regulating temperature, and/or the cut-off temperature are functions of the power dissipation rate of the LED in various aspects, and may vary depending upon the LED. Accordingly, the thermal management apparatus 10 may be designed to correspond to the normal temperature range, current compensation region, regulating temperature, and/or cut-off temperature of the LED. In some designs, the current compensation region may be quite narrow, so that the LED forward current essentially varies between maximum forward current and cut-off. In other designs, the current compensation region may be quite broad, so that the LED may be operated over a range of ambient temperatures at a range of derated currents between the maximum forward current and cut-off.

The power dissipation rate of the LED, in various aspects, is related to the thermal resistance of the LED package. For example, if the thermal resistance of the LED package is 300° C./Watt and the forward power applied to the LED is 0.1 W, then the LED will reach an internal temperature of 30° C. above the ambient temperature due to internal heating of 0.1 W. With internal temperature 30° C. above the ambient temperature, the LED has a power dissipation rate of 0.1 W, so that the LED is generally in thermal equilibrium. Thermal runaway may occur when the forward power applied to the LED exceeds the power dissipation rate of the LED. In order to prevent thermal runaway, the forward current supplied to the LED is derated, i.e. decreased from the maximum forward current, as the ambient temperature increases. The LED manufacturer's specifications may indicate the maximum forward current at 25° C. (77° F.) and the decreased current for ambient temperatures above 25° C., and, accordingly, the normal temperature range, the current compensation region, the regulating temperature, and the cut-off temperature may be based upon the manufacturer's specifications.

In the implementation illustrated in FIG. 6, the normal temperature range generally extends to ambient temperatures below the regulating temperature of about 40° C., and the LED may be operated at maximum forward current without significant degradation generally throughout the normal temperature range. The current compensation region, in this implementation, is bounded at the low end by the regulating temperature, which is about 40° C., and bounded at the high end by the cut-off temperature, which is about 68° C. The current delivered to the one or more LED's contained in the LED module is derated to the derated current as the ambient temperature increases from the regulating temperature to the cut-off temperature within the current compensation region in order to prevent thermal degradation of the LED and/or runaway. When the ambient temperature exceeds the cut-off temperature, the current is cut off to the LED's contained in the LED module in order to protect the LED's from thermal degradation and/or prevent runaway. The derated current may be essentially zero when the ambient temperature exceeds the cut-off temperature. Accordingly, the driver, the temperature sensor, and the thermal controller may be adapted to deliver current to the LED's contained in the LED module as a function of ambient temperature as indicated in FIG. 6. For example, in the implementation of FIG. 4, the driver transistor 120, thermal control transistor 140, and thermistor 160 may be chosen such that current is delivered to the LED 101 and LED 102 as a function of ambient temperature is as indicated in FIG. 6.

Methods for thermal management of thermal management of the LED module disposed within the sign cavity of the channel sign, in various aspects, include detecting the ambient temperature within the sign cavity generally proximate the LED module. The methods may include delivering the maximum forward current as recommended by the manufacturer of the LED's to the LED's within the LED module if the ambient temperature generally proximate the LED module is generally less than the regulating temperature. The methods may include delivering the derated current to the LED's within the LED module if the ambient temperature generally proximate the LED module is generally greater than the regulating temperature and less than the cut-off temperature. The derated current is less than the maximum forward current. The methods may include cutting off the current delivered to the LED's within the LED module if the ambient temperature generally proximate the LED module is generally greater than the cut-off temperature. In various aspects, the derated current may decrease generally continuously as the ambient temperature increases from the regulating temperature to the cut-off temperature.

In various aspects, the methods include regulating each LED module of a plurality of LED modules disposed within the sign cavity of the channel sign independently. For example, a plurality of LED modules may reside within the sign cavity and subjected to variations in the ambient temperature therewithin. In response to the ambient temperature variations within the sign cavity, a portion of the LED modules may be delivering the maximum forward current to the LED's included therein; another portion of the LED modules may be delivering a derated current to the LED's included therein and the derated current may vary from LED module to LED module; and another portion of the LED modules may be cutting off the current to the LED's included therein.

In various aspects, the methods may include defining a regulating temperature and a cut-off temperature based upon the manufacturer's specifications when the manufacturer's specifications indicate the maximum forward current at 25° C. (77° F.) and the decreased current for ambient temperatures above 25° C.

The foregoing discussion discloses and describes merely exemplary implementations. Upon study of this specification, one of ordinary skill in the art will readily recognize from such discussion, and from the accompanying figures and claims, that various changes, modifications and variations can be made therein without departing from the spirit and scope of the following claims.

What is claimed is:

1. A sign comprising:
   signage housing having a sign cavity therein;
   a plurality of LED modules disposed within the sign cavity, wherein each of the LED modules is electrically coupled to power a distribution circuit and comprises:
   at least one LED intended for operation within a normal temperature range;
   a driver circuit coupled to the at least one LED for supplying current thereto;
   a control circuit coupled to the driver for regulating the current from the driver to the at least one LED; and
   a temperature sensor coupled to the control circuit for furnishing a temperature signal to the control circuit indicative of ambient temperature about the LED;
   wherein the control circuit is responsive to the temperature signal for reducing or cutting off current from the driver circuit to the LED when the ambient temperature exceeds the normal temperature range;
   wherein a first one of the LED modules comprises a first LED having a first normal operating temperature range and a first cutoff temperature; and
   a second one of the LED modules comprises a second LED having a second normal operating temperature range different than the first normal operating temperature range, and a second cutoff temperature different than the first cutoff temperature.

2. The sign of claim 1 wherein the control circuits of the respective LED modules operate independently of one another.

3. The sign of claim 1 wherein:
   the control circuit is responsive to the temperature signal for regulating the driver circuit to supply a maximum forward current to the at least one LED when the ambient temperature is within the normal temperature range; and
   the control circuit is further responsive to the temperature signal for regulating the driver circuit to cut off current to the at least one LED when the ambient temperature exceeds the normal temperature range.

4. The sign of claim 1 wherein:
   the control circuit is responsive to the temperature signal for regulating the driver circuit to supply a maximum forward current to the at least one LED when the ambient temperature is within the normal temperature range; and
   the control circuit is further responsive to the temperature signal for regulating the driver circuit to cut off current to the at least one LED when the ambient temperature exceeds a cutoff temperature in excess of the normal temperature range; and
   the control circuit is responsive to the temperature signal for regulating the driver circuit to supply a derated current to the at least one LED when the ambient temperature exceeds the normal temperature range and is less than the cutoff temperature.

5. The sign of claim 4, wherein the derated current inversely varies in a substantially continuous manner as a function of the ambient temperature.

6. The sign of claim 1 wherein the temperature sensor comprises a thermistor.

7. The sign of claim 6 wherein the thermistor is a negative temperature coefficient thermistor.

8. A method for thermally managing signage having a plurality of LED modules disposed within a cavity therein, each having at least one LED, comprising:
   detecting a first ambient temperature proximate a first LED in a first one of the LED modules;
   supplying forward current to the first LED when the first ambient temperature is within a first normal temperature range for the first LED;
   cutting off current to the first LED when the first ambient temperature reaches a first cutoff temperature outside of the first normal temperature range for the first LED;
   detecting a second ambient temperature proximate a second LED in a second one of the LED modules;
   supplying forward current to the second LED when the second ambient temperature is within a second normal temperature range for the second LED; and
   cutting off current to the second LED when the second ambient temperature reaches a second cutoff temperature outside of the second normal temperature range for the second LED;
   wherein the detecting, supplying and cutting off steps for the first LED are independent of the detecting, supplying and cutting off steps for the second LED.

9. The method of claim 8 further comprising:
   supplying a derated current to the first LED when the first ambient temperature reaches the first normal temperature range and is less than the first cutoff temperature; and
   supplying a derated current to the second LED when the second ambient temperature reaches the second normal temperature range and is less than the second cutoff temperature;
   wherein the derated current supplying step for the first LED is independent of the derated current supplying step for the second LED.

* * * * *